United States Patent
Uehara

[19]

[11] Patent Number: 6,108,445
[45] Date of Patent: *Aug. 22, 2000

[54] CHARACTER INPUT DEVICE USING PREVIOUSLY ENTERED INPUT AND DISPLAYED CHARACTER DATA

[75] Inventor: Takashi Uehara, Asaka, Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/891,985

[22] Filed: Jul. 14, 1997

[30] Foreign Application Priority Data

Jul. 16, 1996 [JP] Japan .................................. 8-186165

[51] Int. Cl.[7] .................................................. G06K 9/00
[52] U.S. Cl. ............................................. 382/189; 707/530
[58] Field of Search .................................... 382/187, 189, 382/282, 309, 315; 704/3, 4; 707/532, 530, 531, 534, 540, 541

[56] References Cited

U.S. PATENT DOCUMENTS

| | | | |
|---|---|---|---|
| Re. 32,773 | 10/1988 | Goldwasser et al. | 364/419 |
| 4,972,496 | 11/1990 | Sklarew | 382/13 |
| 5,459,796 | 10/1995 | Boyer | 382/187 |
| 5,535,119 | 7/1996 | Ito et al. | 704/3 |
| 5,655,128 | 8/1997 | Fushimoto | 704/4 |
| 5,666,139 | 9/1997 | Thielens et al. | 345/173 |
| 5,778,404 | 7/1998 | Capps et al. | 707/531 |
| 5,832,113 | 11/1998 | Sano | 382/187 |
| 5,881,169 | 3/1999 | Henry, Jr. | 382/187 |
| 5,956,423 | 9/1999 | Frink et al. | 382/187 |

FOREIGN PATENT DOCUMENTS

| | | | |
|---|---|---|---|
| 0 496 297 | 7/1992 | European Pat. Off. | G06K 9/22 |
| 0 660 218 | 6/1995 | European Pat. Off. | G06F 3/033 |
| 3-176724 | 7/1991 | Japan | G06F 3/033 |
| WO 94/09438 | 4/1994 | WIPO | G06F 15/00 |

OTHER PUBLICATIONS

Simpson, Mastering Wordperfect® 5.1 & 5.2 for Windows™, Sybex, Inc., 1993, pp. 30–31, 36–45 and 60–61.

*Primary Examiner*—Andrew W. Johns
*Attorney, Agent, or Firm*—Frishauf, Holtz, Goodman, Langer & Chick, P.C.

[57] ABSTRACT

An input device including a display unit for displaying thereon characters entered from a keyboard or by a pen inputting operation, a character selector including a tablet for selecting any character from among the characters displayed on the display unit, and a CPU for receiving the characters selected by the character selector as a new input. When any character is selected from an already input character string displayed on the display unit, the selected character is added as a new character input to the already input characters, and displayed together on the display unit.

10 Claims, 9 Drawing Sheets

FIG.8A
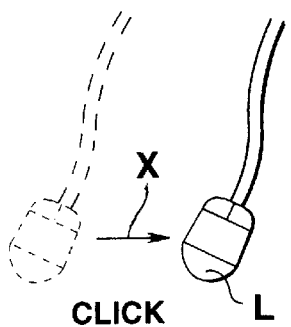
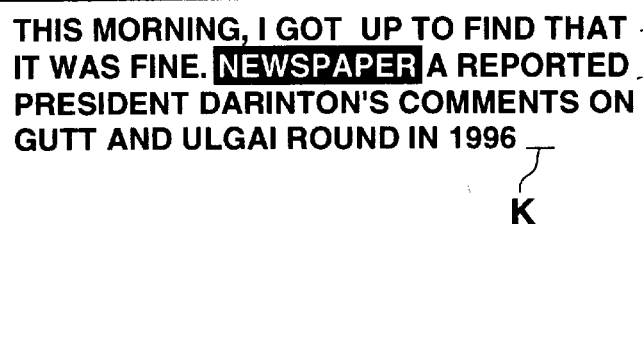
CLICK
FIG.8B
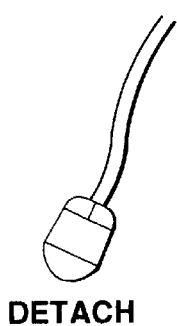
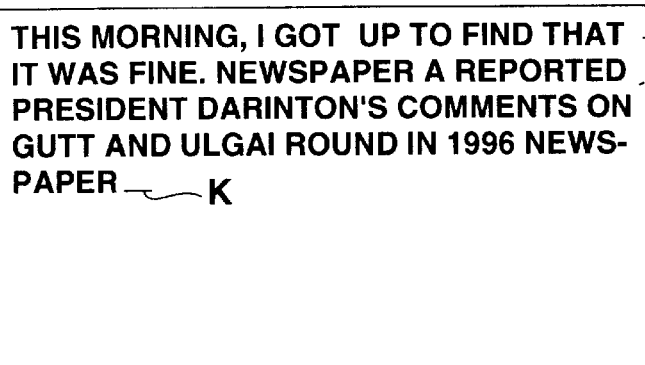
DETACH

FIG.9A

~ Y = A CONVERT X ~

P

| PROBLEM : FOR FUNCTIONAL EXPRESSION Y = α X, | | | | | | | | | | | ~18<br>----13 |
|---|---|---|---|---|---|---|---|---|---|---|
| ⌐K | | | | | | | | | | |
| CON-VERT | 1 | 2 | 3 | 4 | 5 | 6 | 7 | 8 | 9 | 0 |
| | Q | W | E | R | T | Y | U | I | O | P |
| FIX | A | S | D | F | G | H | J | K | L | - |
| | = | Z | X | C | V | B | N | M | , | + |

| PROBLEM : FOR FUNCTIONAL EXPRESSION Y =͏α X, | | | | | | | | | | | ~18<br>----13 |
|---|---|---|---|---|---|---|---|---|---|---|
| ⌐K  P | | | | | | | | | | |
| X | | | | | | | | | | |
| CON-VERT | 1 | 2 | 3 | 4 | 5 | 6 | 7 | 8 | 9 | 0 |
| | Q | W | E | R | T | Y | U | I | O | P |
| FIX | A | S | D | F | G | H | J | K | L | - |
| | = | Z | X | C | V | B | N | M | , | + |

| PROBLEM : FOR FUNCTIONAL EXPRESSION Y = α X, | | | | | | | | | | | ~18<br>----13 |
|---|---|---|---|---|---|---|---|---|---|---|
| α = ⌐K | | | | | | | | | | |
| CON-VERT | 1 | 2 | 3 | 4 | 5 | 6 | 7 | 8 | 9 | 0 |
| | Q | W | E | R | T | Y | U | I | O | P |
| FIX | A | S | D | F | G | H | J | K | L | - |
| | = | Z | X | C | V | B | N | M | , | + |

13b           ~13c

CHARACTER INPUT DEVICE USING PREVIOUSLY ENTERED INPUT AND DISPLAYED CHARACTER DATA

BACKGROUND OF THE INVENTION

1. Field of the Invention

The present invention relates to character input devices and methods for entering characters such as characters/numerals, and recording mediums which contain a character input program, and more particularly to a character input device which have a pen input function, a character converting function, a character recognizing function, and a mouse to perform a character input operation and a method and recording medium which fulfills such functions.

2. Description of the Prior Art

Conventionally, when a document such as a schedule or a memorandum is entered in information devices such as electronic notebooks and/or PDAs (Personal Digital Assistants) having a pen input function, input characters handwritten with a pen on a tablet are recognized and entered or a software keyboard is displayed on a tableted display screen and appropriate displayed characters on the software keyboard are touched with the pen for entering purposes.

There are software programs which have copying and pasting functions and/or cutting and pasting functions installed in a personal computer in which the user enters characters from a keyboard, specifies any one of the entered characters, for example, with a mouse copies and pastes it at a desired position.

When handwritten characters entered with a pen are recognized in an information device such as an electronic notebook having a conventional pen input function, the user's handwriting greatly influences the rate of character recognition. Thus, it takes a great deal of time to recognize and input all the letters in a document to be inputted.

Also, when a software keyboard displayed on a pen input display screen is touched with a pen to input characters, one key area is very narrow and difficult to touch with a pen. Thus, operability is low and it takes much time to input all the data in the document to be inputted.

In addition, in order to fulfill the copying and the pasting function of a personal computer, etc., a process must be performed in which characters to be copied are selected, a "copy" is selected from a menu, a position at which the copied characters are pasted is specified, and a "paste" is then selected from the menu, which takes much time.

SUMMARY OF THE INVENTION

It is therefore an object of the present invention to provide a character input device and method which is capable of entering characters easily, efficiently and rapidly, without keying or writing in all desired characters from a keyboard or with a pen, and converting and recognizing all desired characters, and also to provide a recording medium which contains a character input program permitting such character input operation.

In order to achieve the above object, the present invention provides a character input device comprising:

input means for providing data, and display means for displaying the data provided by the input means;

specifying means for specifying any range of a part of the data displayed on the display means due to a user's operation; and data adding means for adding data corresponding to the range of a part of the data specified by the specifying means as new input data to the data displayed by the displaying means.

According to such arrangement, characters are inputted efficiently, rapidly and easily in various devices.

BRIEF DESCRIPTION OF THE DRAWINGS

FIGS. 8A and 8B show character input and display states involved in the character input process performed, using a mouse in a personal computer; and FIGS. 9A–9C show letter input and display states involved in the letter input process wherein a software keyboard is displayed in a pen input display unit of the electronic notebook.

DESCRIPTION OF THE PREFERRED EMBODIMENTS

An embodiment of an input device according to the present invention will be described next with reference to the accompanying drawings. In order to effectively show the effectiveness of the present invention, the input device of the present invention is applied to an input processing for a Japanese language will be described. Of course, the present invention is applicable to not only Japanese, but also to English and all other characters with advantageous effects.

First, a Japanese language includes three kinds of characters; hiragana letters, katakana letters and Chinese characters which are usually used in a mixed manner to compose a series of sentences, so that the expressiveness of the sentences is enhanced and the sentences are easy to read, understand and create.

For example, in an input process using a keyboard, usually, hiragana letters are first inputted, a required portion of the inputted hiragana letters is converted to Chinese characters or katakana letters to create a series of sentences.

In order to perform another input method, a device using a tablet is recently provided. When characters are handwritten on the tablet with an input pen, the handwritten characters are recognized and converted to text data to thereby input a series of sentences.

An embodiment of the input device according to the present invention will be described next.

Figure 1:
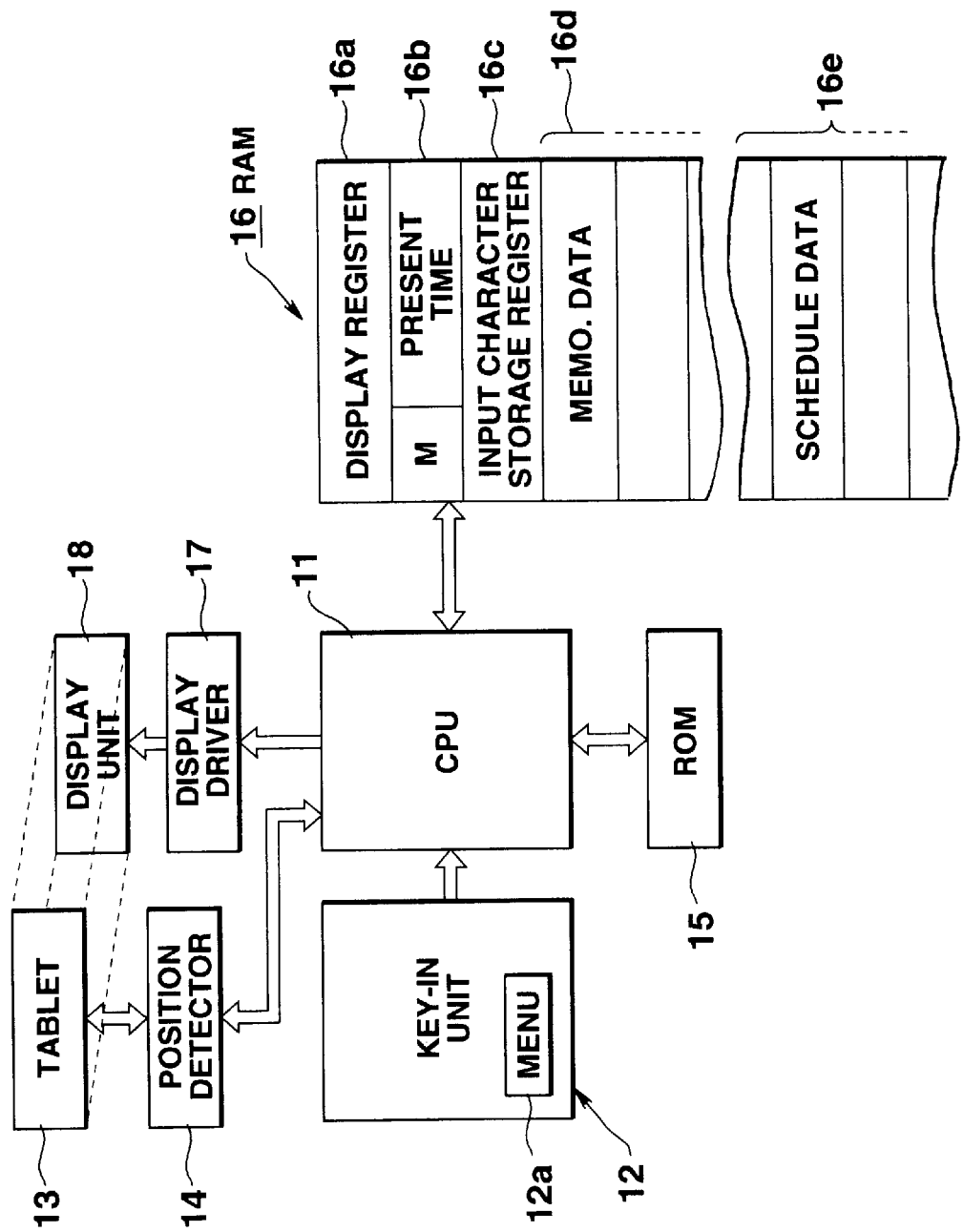
FIG. 1 is a block diagram of an electronic circuit of an electronic notebook as an embodiment of an input device according to the present invention.

FIG. 1 is a block diagram of an electronic circuit of an electronic notebook as the embodiment of the input device according to the present invention. The notebook is provided with a CPU (Central Processing Unit) 11, which starts up a system program contained in a ROM 15 in accordance with a key-in signal entered from a key-in unit 12 or a position detection signal indicative of a pen touch position entered via a position detector 14 from a tablet 13, and controls the operations of the related circuit elements, using a RAM 16 as a work RAM.

CPU 11 is, of course, connected to the key-in unit 12, tablet 13, position detector 14, ROM 15 and RAM 16 and further, for example, a liquid crystal dot matrix display unit 18 via a display driver 17.

The key-in unit 12 is provided with a "menu" key 12a operated to display a menu screen from which to select any one of various operational modes of the electronic notebook such as a schedule mode, memorandum mode, address mode, etc.

The tablet 13 is provided with a transparent panel provided overlapping on the display screen of the display unit 18 and generates an X- and a Y-direction voltage signal corresponding to the position where the pen is touched.

The position detector 14 detects X and Y coordinates on the display screen of the display unit 18 corresponding to the X and Y direction voltage signals depending on a pen touch position whose data is inputted from the tablet 13, and transfers data on the detected X and Y coordinates of the pen touch position to the CPU Thus, CPU 11 causes the display unit 18 to display the locus of the pen-touched position on the display unit 18 depending on the data on the detected coordinates of the pen-touched position transferred by the position detector 14 and/or determines the contents of the pen-touching operation from the contents of the data displayed on the display unit 18.

The ROM 15 contains a system program which controls the whole operation of the electronic notebook, a plurality of subprograms which control a plurality of operational modes such as a schedule mode, a memorandum mode, and an address mode, and a character recognition program started up when characters are entered in the respective operational modes.

The ROM 15 may be an external recording medium.

The RAM 16 is provided with a display register 16a in which data to be displayed on the display unit 18 is spread and stored as bit map data, a mode register M in which flag data corresponding to a set operational mode is set, a present time register 16b, an input character storage register 16c, a memorandum register 16d, and a schedule data register 16e.

Data on the present date, day of the week and time are successively updated and stored in the present time register 16b of the RAM 16 on the basis of data on the time counted by a time counter built in the CPU 11.

Character data entered by the pen-touching operation on the tablet 13 are stored in the input character storage register 16c.

Memorandum data and schedule data stored in the input character storage register 16c when the corresponding character input processes are performed in the respective operational modes, are transferred to and stored in the memorandum register 16d and schedule data register 16e, respectively.

Data entered, set and retrieved due to the entering operation of the key-in unit 12 and the pen-touching operation on the tablet 13 are displayed on a real time basis on the display unit 18.

Figure 2:
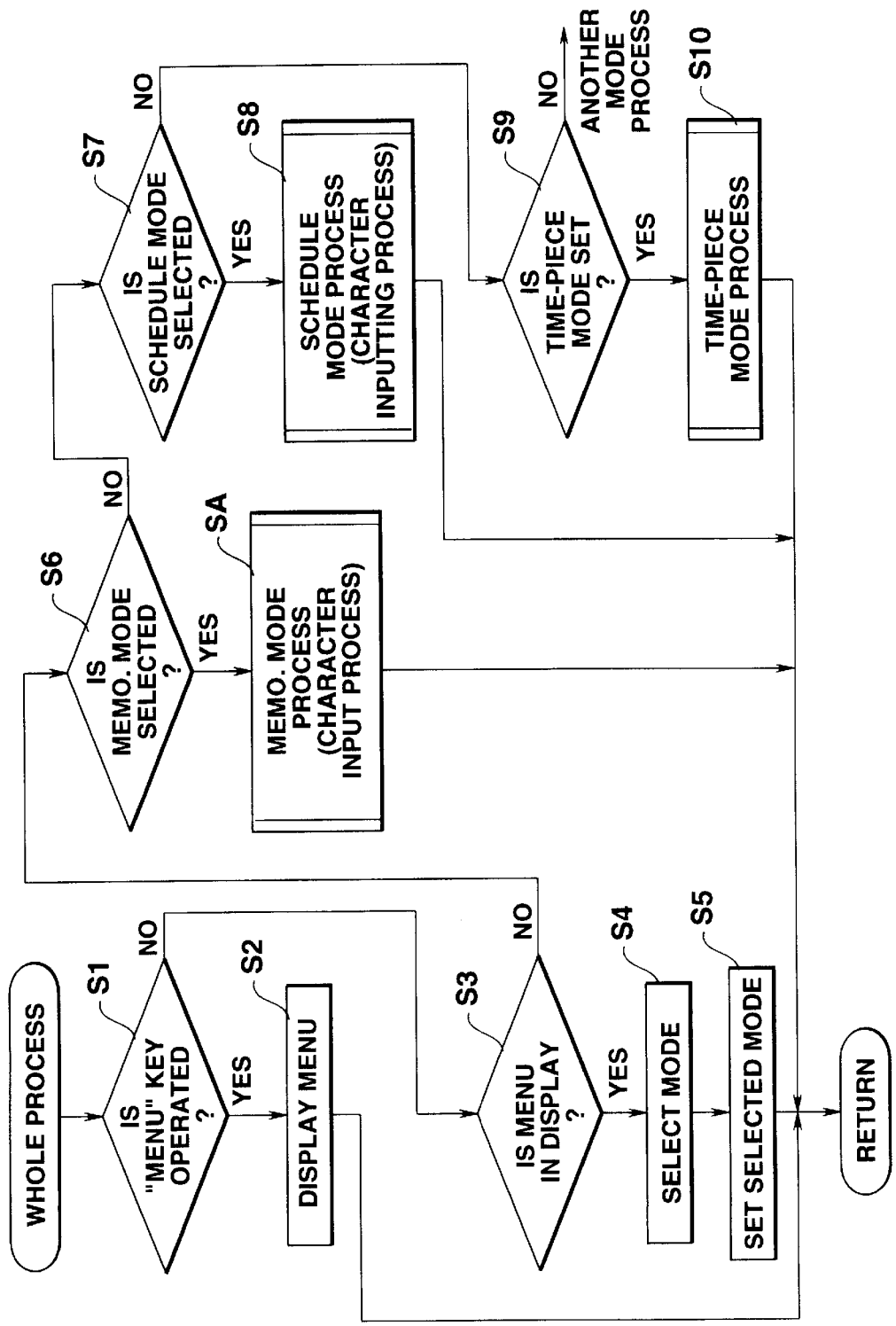
FIG. 2 is a flow chart of a whole process performed in the electronic notebook.

The operation of the inventive electronic notebook will be described next with reference to a flow chart of FIG. 2 which shows the whole operation of the notebook. When the "menu" key 12a of the key-in unit 12 is operated, a menu select screen to selectively set an operational mode of the electronic notebook is displayed on the display unit 18 via the display driver 17 (step S1→S2).

The position of one of the displayed icons which represent the respective operational modes is specified by the pen-touching operation on the tablet 13 in the displayed menu select screen, the operational mode selectively specified on the menu select screen is set to start up a corresponding program, and the initial display screen for the selected operational mode is displayed on the display unit 18 in place of the menu select screen (step S3→S4, S5).

In this case, flag data corresponding to the set operational mode is set in the mode register M of RAM 16.

When the memorandum mode is set in the menu select setting process at steps S1→S5, a memorandum mode process is started up (step S6→SA).

When the schedule mode is set, the schedule mode process is started up (step S7→S8).

When the time-piece mode is set, the time-piece mode process is started up (step S9→S10).

When the notebook mode is set, the notebook mode process is started up (step S9→another mode process).

Figure 3:
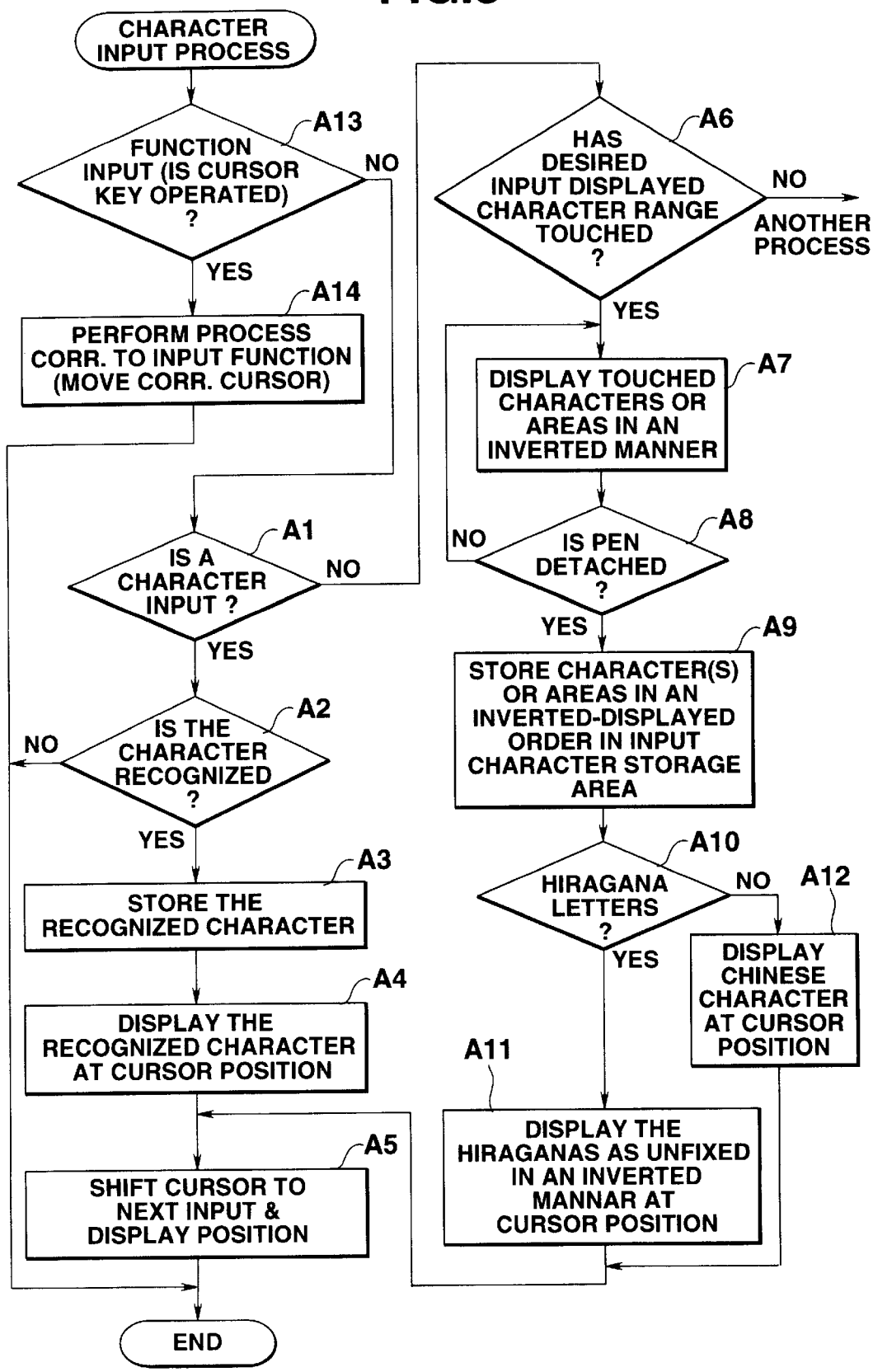
FIG. 3 is a flow chart of a character input process performed in a memorandum mode of the electronic notebook.

FIG. 3 is a flow chart of a character input process performed in the memorandum mode of the electronic notebook.

FIGS. 4A–4D show character input and display states (part 1) involved in the character input process in the memorandum mode of the electronic notebook.

Figure 5A:
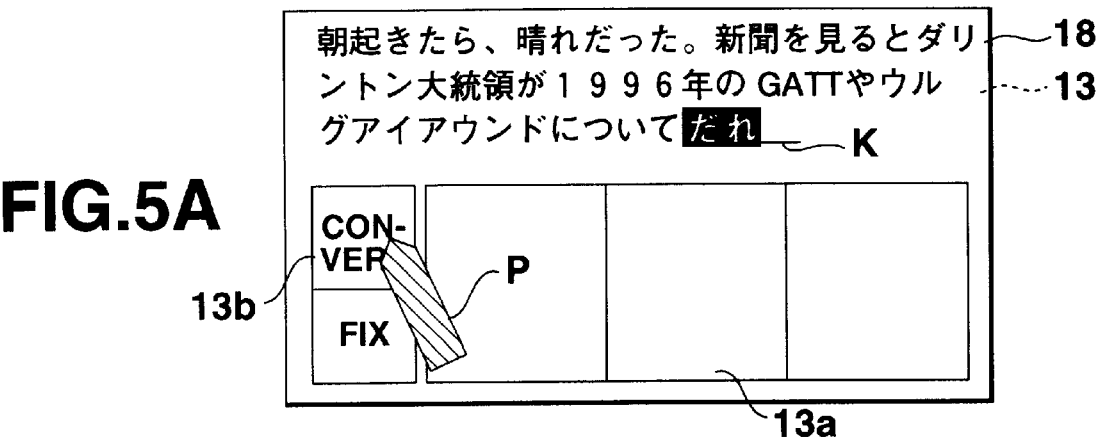
FIGS. 5A and 5B show character input and display states (part 1) involved in the character input process in the memorandum mode of the electronic notebook.
Figure 5B:
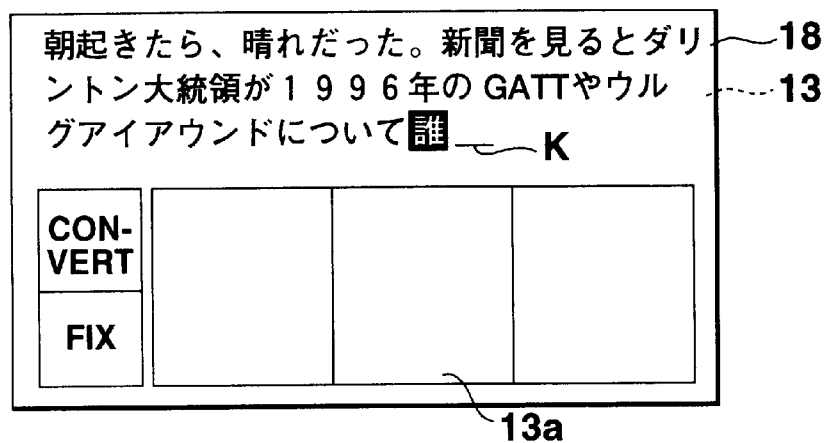

FIGS. 5A and 5B show character input and display states (part 2) involved in the character input process in the memorandum mode of the electronic notebook.

Figure 4A:
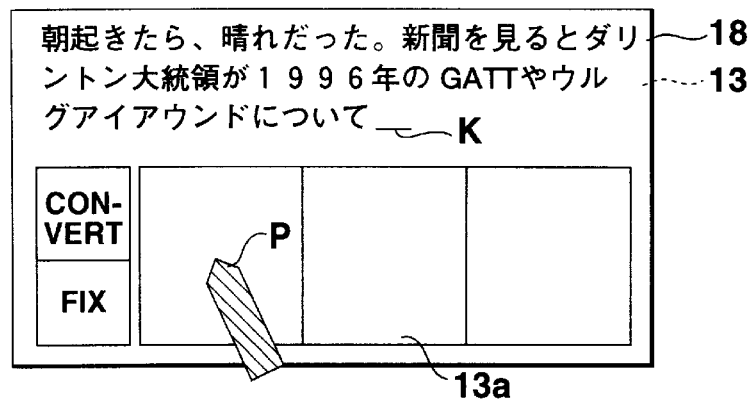
FIGS. 4A–4D show character input and display states (part 1) involved in the character input process in the memorandum mode of the electronic notebook.

When the operational mode of the notebook is set in the memorandum mode in the menu selecting and setting process and the character input process in the memorandum mode is started up, handwritten character recognition areas 13a are displayed in a lower area of the display 18 screen, as shown in FIG. 4A.

Any character or letter is written on the tablet 13 with a pen P and displayed in one of the handwritten character recognition areas 13a, and detected coordinate data corresponding to a locus of the delineation of the written character or letter from the positional detector 14 is inputted to the CPU. When no detected coordinate data are then input for a given time, the pen inputting operation for one character or letter is determined to be completed and a character recognition process is started on the basis of the detected coordinate data corresponding to the locus of the pen-touched position input so far by the position detector 14, the input character is recognized and stored as character data in the input character storage register 16c of RAM 16 (step A1→A2→A3).

The recognized character is then displayed in correspondence to the position of the cursor K displayed in the input character display area which constitutes an upper portion of the display unit 18, and the cursor K is moved to the next character input and display position (steps A4, A5).

Figure 4B:
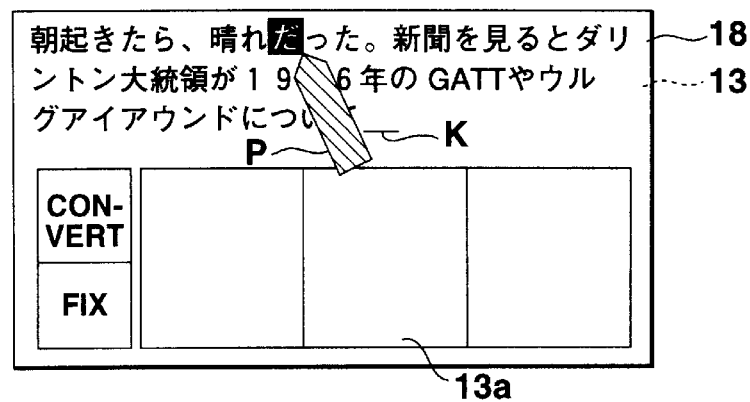

In this way, the input and recognition process of handwritten characters by the pen-touching operation at steps A1–A5 is repeated, so that a certain number of characters are inputted and displayed. When, for example, a Chinese character "誰" is then to be inputted, a hiragana letter "だ"

is first found and touched with the pen P in the inputted character string displayed in the input character display area of the display unit 18, as shown in FIG. 4B. In response to this operation, the hiragana letter "だ" displayed in correspondence to the pen-touched position is displayed in an inverted manner (step A6→A7).

Figure 4C:
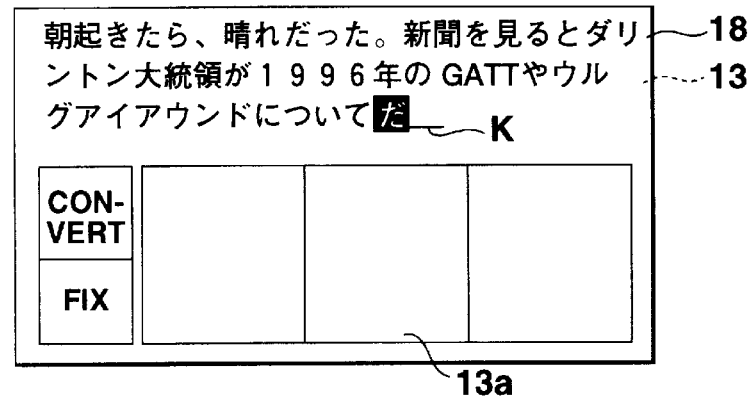

When the touching operation on the displayed hiragana letter "だ" with the pen P is stopped, the detected coordinate data input from the position detector 14 disappears. In response to this operation, the hiragana letter "だ" displayed in the inverted manner by the pen-touching operation is additionally stored as character data in the input character storage register 16c of RAM 16. In addition, this character data is determined as a hiragana letter and displayed in an inverted manner as an unfixed letter in correspondence to the position of the cursor K, as shown in FIG. 4C (step A8→A9→A10, A11).

Simultaneously, the display position of the cursor K is shifted to the next character input display position (step A5).

Figure 4D:
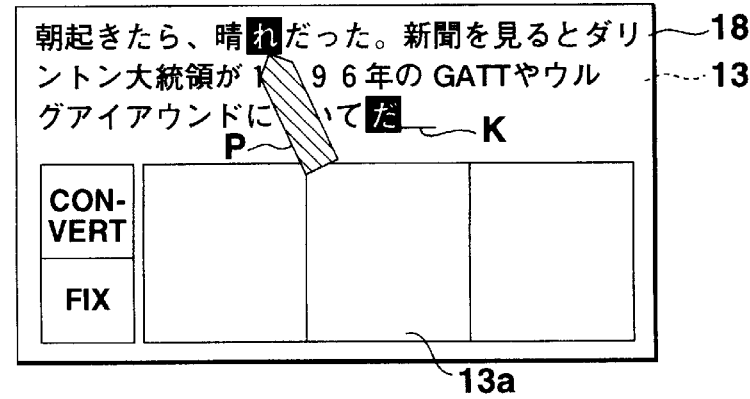

Subsequently, as shown in FIG. 4D, when a hiragana letter "れ" is found and then touched with the pen P in the inputted character string displayed in the input character display area of the display unit 18, the hiragana letter "れ" displayed in correspondence to the pen touch position is displayed in an inverted manner (step A6→A7).

When the touching operation on the displayed hiragana letter "れ" with the pen P is stopped, an input of the detected coordinate data from the position detector 14 disappears. In response to this operation, the hiragana letter "れ" displayed in the inverted manner by the pen-touching operation is additionally stored as character data in the input character storage register 16c of RAM 16. In addition, this character data is determined as a hiragana letter and displayed in an inverted manner as an unfixed letter in correspondence to the position of the cursor K, as shown in FIG. 5A (step A8→A9→A10, A11).

Simultaneously, the display position of the cursor K is shifted to the next character input display position (step A5).

When a function input key "convert" 13b displayed adjacent to the handwritten character recognition area 13a is touched with the pen P in the state where the "だれ" is inputted and displayed in an inverted manner, using the inputted character string displayed in the input character display area of the display unit 18 due to the character specifying operation with the pen P, the inverted displayed hiranagana letters "だれ" are converted to a Chinese character "誰", which is displayed as shown in FIG. 5B, and the unfixed hiragana letters "だれ" stored in the input character storage register 16c are also converted to the Chinese character "誰", which is then stored (step A13→A14).

When the cursor K is to be moved upward, downward, leftward or rightward during the character inputting operation, a corresponding cursor key (not shown) of the key-in unit 12 is operated (step A13→A14).

FIG. 6 shows a character input and display state (part 3) in the character input process in the memorandum mode of the notebook.

Figure 6A:
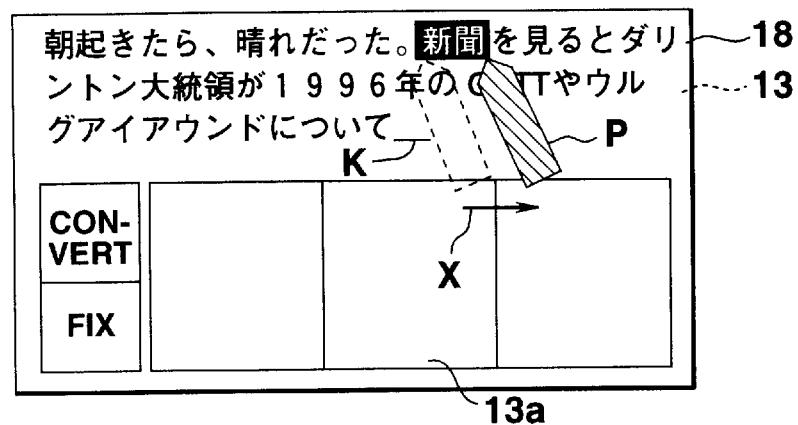
FIGS. 6A and 6B show character input and display states (part 1) involved in the character input process in the memorandum mode of the electronic notebook.

The input and recognition process of handwritten characters by the pen-touching operation at steps A1–A5 are repeated, so that a certain number of characters are inputted and displayed. When, for example, Chinese characters "新聞 (news paper)" are then to be inputted, Chinese characters "新聞" are first found and their range of indication is touched in a sliding manner, as shown in arrow X, with the pen P in the inputted character string displayed in the input character display area of the display unit 18, as shown in FIG. 6A. In response to this operation, the Chinese characters "新聞" displayed in response to the pen-touched range are displayed in an inverted manner (step A6→A7).

Figure 6B:
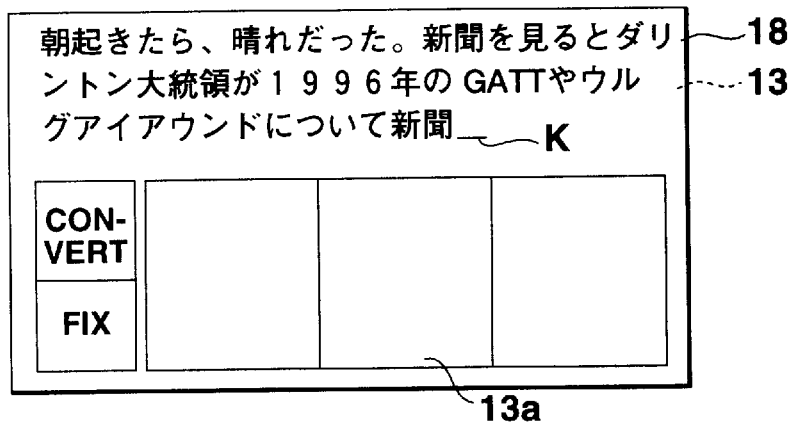

When the touching operation on the displayed Chinese characters "新聞" with the pen P is stopped, the detected coordinate data input from the position detector 14 disappears. In response to this operation, the Chinese characters "新聞" displayed in the inverted manner by the pen-touching operation are additionally stored as character data in order of pen-touching in the input character storage register 16c of RAM 16. In addition, those character data are determined as not being hiragana letters, and displayed in order of pen-touching in correspondence to the position of the cursor K, as shown in FIG. 6B (step A8→A9→A10, A12).

Simultaneously, the display position of the cursor K is shifted to the next character input display position (step A5).

Thus, a desired character to be inputted may be directly pen-touched and inputted as a new character from among the inputted character string displayed in the input character display area of the display unit 18.

Thus, according to the inventive electronic notebook, when a desired character/symbol/character string portion or range is specified directly with the pen touching operation from among a measure of handwritten character string inputted with the pen P on the tablet, recognized and displayed in the input character display area in correspondence to the handwritten character recognition area 13a displayed on the display unit 18, character/symbol/character string data corresponding to the pen-touched position or the pen-touched range is displayed in an inverted manner. Thereafter, when the detachment of the pen P from the tablet 13 is detected, the character or character string data displayed in the inverted manner by the pen-touching operation is additionally displayed as the new input character or character string in correspondence to the display position of the cursor K. Thus, for example, by repeatedly recognizing the individual characters of the whole document entered as memorandum data, a character/character string of the same style which is especially difficult to recognize accurately can be easily inputted directly at a desired position by a simple operation without the need for keying in or handwriting all the desired character string data. Thus, the character inputting efficiency is greatly improved.

While in the embodiment the direct character inputting process with the pen-touching operation, using the character string data inputted and displayed by the character recognition process has been described, in the state where the handwritten character recognition area 13a is displayed on the display unit 18, a direct new-character inputting operation can be easily performed by a pen-touching and inputting operation similar to that described in the embodiment, for example, using character string data inputted and displayed in the key-in process in a software keyboard 13c displayed in the display unit 18, as shown in FIGS. 7A–7D.

Figure 7A:
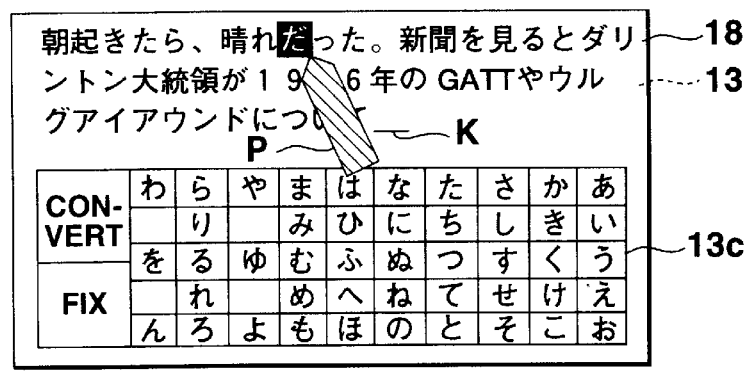
FIGS. 7A–7D show letter input and display states involved in the letter input process wherein a software keyboard is displayed in a pen input display unit of the electronic notebook.

FIGS. 7A–7D show character input and display states in the character input process in which a software keyboard 13c is displayed in the pen-input display unit 18 of the notebook. As shown in FIG. 7A, when a hiragana letter "だ" is found and touched with the pen P in the entered character string displayed in the input character display area of the display unit 18, the hiragana letter "だ" displayed in correspondence to the pen-touched position is displayed in an inverted manner.

Figure 7B:

As shown in FIG. 7B, when a hiragana letter "ん" is found and touched with the pen P in the inputted character string displayed on the input character display area, the hiragana letter "ん" displayed in the inverted manner by the previous pen-touching operation is newly inputted and displayed in correspondence to the display position of the cursor K and the hiragana letter "ん" displayed in correspondence to the this-time pen-touched position is displayed in an inverted manner.

Figure 7C:
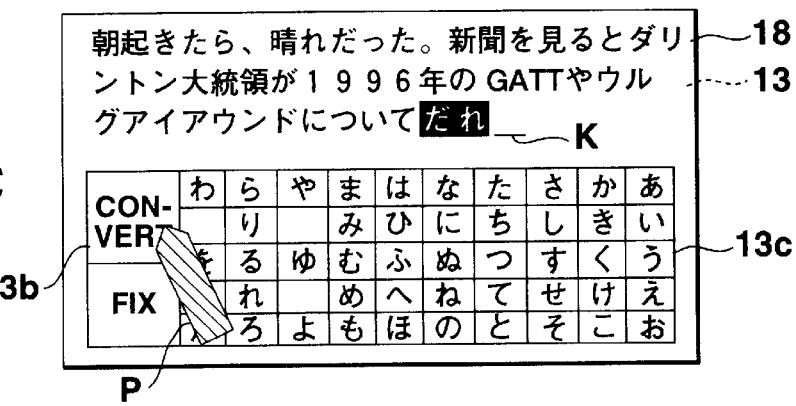
Figure 7D:
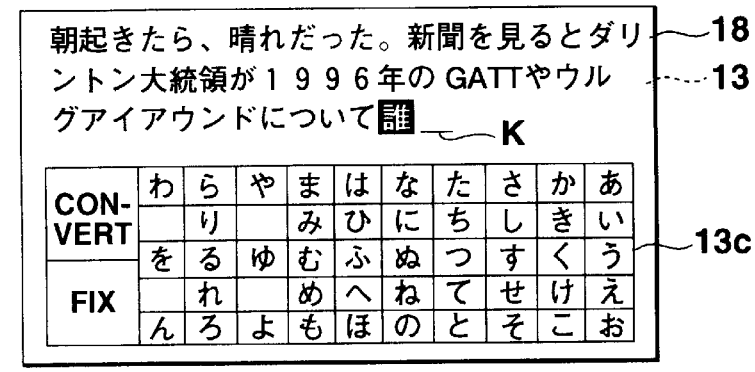

As shown in FIG. 7C, when the function input "convert" 13b is touched with the pen in the state where the hiragana letter string "だん" inputted directly by the pen-touching operation is displayed in the inverted manner, the hiragana letter string is converted to a Chinese character "誰", which is then displayed, as shown in FIG. 7D.

Thus, also in the character input process using the software keyboard 13c, the character input operation is performed efficiently, using the inputted character string.

In the embodiment, a function of displaying input handwritten characters as a new character input by displaying the input handwritten characters as they are and specifying those characters in the pen-touching operation may be provided additionally.

An alphabetical letter input process, using a mouse will be described next. FIGS. 8A and 8B each show a letter input display state involved in the letter input process in which letters inputted from the keyboard are edited using a mouse L.

As shown in FIG. 8A, when letters "newspaper" are found in the letter string entered at the keyboard displayed in the input letter display area of the display unit 18 and specified with the mouse L, they are displayed in an inverted manner at their specified positions.

When the operation of specifying the displayed letters "newspaper" with the mouse L is stopped, the letters "newspaper" displayed in the inverted manner in the specifying process with the mouse are additionally stored as character data in the input character storage register 16c of the RAM 16 and inputted and displayed in correspondence to the position of the cursor K. Simultaneously, the display position of the cursor K is shifted to the next letter input display position.

Thus, desired letters can be inputted only by directly specifying the desired letters with the mouse L from among the inputted character string displayed in the input character display area of the display unit 18.

While the hiragana letter-to-Chinese character converting process has been illustrated with respect to FIGS. 3–7D, a process for converting a particular alphabetical letter to another corresponding letter will be described next as another embodiment. FIGS. 9A, 9B and 9C show letter input and display states involved in a letter input process which includes edition of input letters with a pen among letters input from a software keyboard.

As shown in FIG. 9A, letters and a symbol are entered from the software keyboard 13c and displayed in an input display area of a display unit 18. A displayed letter "α" is obtained by touching a letter "A" on the software keyboard 13c with the pen P and then touching a function "convert" on the keyboard 13c with the pen.

When "α" and "=" are then found among in an input letter string displayed in the input display area of the display unit 18, and then range-specified while being slid with the pen P in the direction of arrow X, the "α" and "=" displayed in correspondence to the pen-touched position are displayed in an inverted manner (FIG. 9B).

By stopping the specifying of the displayed letter and symbol "α" and "=", that is, by detaching the pen from the display unit 18, the letters and symbol are additionally stored as character data in inverted-displayed order in the input character storage register 16c of RAM 16, and displayed in pen-specified order in correspondence to the displayed position of the cursor (FIG. 9C). Simultaneously, the display position of the cursor is shifted to the next letter input and display position. Thus, the time required for conversion of data in the data input process is saved.

The present invention can be carried out in other various forms without departing from the spirit and main features thereof. For example, the present invention can effectively be carried out about Arabian/English cursive scripts.

The above embodiment is merely an example in every respects and should not be construed in an limited sense. The scope of the present invention should be limited by the attached claims and not restricted by the text of the specification. Various changes and modifications which fall within the scope of the claims should all be understood as belonging to the present invention.

What is claimed is:

1. A document creating apparatus comprising:

display means having a display screen for displaying any created document;

input position specifying means for specifying an input position on said display screen for a character string of a document under creation;

character string specifying means for manually specifying a desired character string of the any created document displayed on said display screen;

detecting means for detecting that said character string specifying means has completed specifying the desired character string; and character string adding means, responsive to said detecting means detecting that said character string specifying means has completed specifying the desired character string, for adding the specified character string at the specified input position on said display screen.

2. The document creating apparatus according to claim 1, further comprising:

character converting means for converting an unfixed character to another type of character;

wherein said character string adding means comprises:

determining means for determining whether a character of the character string specified by said character string specifying means is convertible to a different type of character string; and unfixed character adding means, responsive to said determining means determining that the character of the character string specified by said character string specifying means is convertible to the different type of character, for adding the determined character as an unconverted unfixed one at the input position for the character string of the document under creation on said display screen, whereby the unfixed character is converted to a different type of character by said character converting means.

3. The document creating apparatus according to claim 1, wherein said character string adding means comprises means, responsive to said character string specifying means specifying the character string by specifying its characters sequentially from its end to its start, for adding the character string specified by said character string specifying means at the input position for the character string of the document under creation on said display screen in the order of the characters of the character string specified by said character string specifying means.

4. The document creating apparatus according to claim 1, further comprising:

input means for inputting a character manually; and input control means for inputting the character input manually by said input means at the input position for a character string of the document under creation on the display screen.

5. The document creating apparatus according to claim 4, wherein said input means comprises:

handwriting input means having a tablet for detecting a handwritten input thereon;

wherein said display means displays on said display screen thereof a locus of the handwriting input by said handwriting input means.

6. The document creating apparatus according to claim 4, wherein said input means comprises:

handwriting input means having a tablet for detecting a handwriting input thereon; and character recognizing means for recognizing a character provided by said handwriting input means;

wherein said display means comprises recognized character display means for displaying the character recognized by said character recognizing means.

7. The document creating apparatus according to claim 4, further comprising:

software keyboard display means for displaying a software keyboard having an array of characters on said display screen of the display means;

wherein said input means comprises:

touch detecting means including a tablet provided overlapping on said display means for detecting a touch at any particular position on the tablet; and touch input means, responsive to said touch detecting means detecting the touch on the tablet, for providing a character at a position on the software keyboard corresponding to the position of the touch on the tablet.

8. The document creating apparatus according to claim 4, wherein said input means comprises a keyboard for providing characters; and wherein said character string specifying means comprises mouse means for specifying any character string manually.

9. A recording medium which contains a computer-readable character program for causing a computer to operate as:

display means having a display screen for displaying any created document;

input position specifying means for specifying an input position on said display screen for a character string of a document under creation;

character string specifying means for manually specifying a desired character string of any created document displayed on said display screen;

detecting means for detecting that said character string specifying means has completed specifying the desired character string; and character string adding means, responsive to said detecting means detecting that said character string specifying means has completed specifying the desired character string, for adding the specified character string at the specified input position on said display screen.

10. A document creating apparatus comprising:

display means having a display screen for displaying any created document;

touch position detecting means including a tablet overlaying said display screen for detecting a touch of a pen at any particular position on the tablet;

input position specifying means for specifying an input position on the tablet for a character string of a document under creation;

character string specifying means, responsive to the touch of a pen on the tablet, for specifying a desired character string of the any created document displayed on said display screen;

detecting means for detecting the completion of the touch on the tablet as the completion of specifying the character string by said character string specifying means; and character string adding means, responsive to the detecting means detecting the completion of specifying the character string, for adding the specified character string at the specified input position on said display screen.

* * * * *